United States Patent [19]

Austin et al.

[11] Patent Number: 4,601,457
[45] Date of Patent: Jul. 22, 1986

[54] FLUID PRESSURE ACTUATOR VALVE

[75] Inventors: Peter W. Austin, New Orleans; Dennis R. Cutcher, Gretna, both of La.

[73] Assignee: Baker CAC, Inc., Belle Chasse, La.

[21] Appl. No.: 782,513

[22] Filed: Oct. 1, 1985

[51] Int. Cl.⁴ .................... F16K 31/12; F15B 21/04; F01B 7/03; F01B 11/02
[52] U.S. Cl. ........................ 251/63; 91/510; 92/1; 92/63; 92/85 B; 92/130 A; 92/153
[58] Field of Search ............... 251/62, 63, 63.5, 63.6, 251/48, 63.4, 54; 92/1, 10, 63, 85 B, 130 A, 143; 137/468; 91/509, 510

[56] References Cited

U.S. PATENT DOCUMENTS

| | | |
|---|---|---|
| 1,173,913 | 2/1916 | Anderson ............................. 251/54 |
| 4,445,424 | 5/1984 | Foster et al. ...................... 92/108 X |
| 4,526,341 | 7/1985 | Thomas .............................. 251/63.5 |

Primary Examiner—Martin P. Schwadron
Assistant Examiner—John S. Starsiak, Jr.
Attorney, Agent, or Firm—Norvell & Associates

[57] ABSTRACT

A gas pressure actuator for effecting the reciprocation of the stem of a valve subject to high-pressure loading comprises a tubular housing secured to the valve bonnet and defining a main cylinder chamber connected in axially series relationship with an auxiliary piston chamber which, in turn, communicates with a secondary fluid pressure chamber containing a compressible spring. A rod-like actuator is slidably and sealably mounted within the actuator housing and carries a main piston which cooperates with the main cylinder chamber in sliding and sealable relationship. The auxiliary piston chamber slidably and sealably mounts an auxiliary piston which is movable independently of the main piston. The actuating movement of the main piston produced by the introduction of gas pressure into the main cylinder produces an axial movement of the actuating rod and a compression of the spring. The spring-containing secondary chamber defined by the actuator housing is filled with a virtually non-compressible fluid. The auxiliary piston can shift in response to temperature-induced expansions of the protective fluid, thus providing automatic volume compensation for such temperature variation. Additionally, the secondary chamber containing the protective fluid may be connected to an auxiliary source of pressure, such as a manual or foot-actuated pump, and sufficient pressure generated in the secondary chamber to actuate the main piston by the auxiliary piston in the event of failure of the primary source of pressured gas. Fluid dampening of the actuator is also provided.

12 Claims, 3 Drawing Figures

FLUID PRESSURE ACTUATOR VALVE

BACKGROUND OF THE DISCLOSURE

1. Field of the Invention

The invention relates to a fluid pressure actuator of the linear type for effecting the shifting of a valve stem from an open to a closed position.

2. History of the Prior Art

In the production of oil and/or gas from subterranean wells, a large number of fluid pressure actuated valves are employed as safety valves, head valves, pipeline valves, etc. Many of such actuators are designed for actuation by air or gas at 250 psi. In recent years, the pressure rating for the valves have increased to the order of 20,000 to 30,000 psi, thus necessitating a very elaborate and very accurately machined sealing assemblies around the stem of the valve. Such sealing assemblage generally involves the maintenance of a minimal clearance between the valve stem and the seal elements mounted in the bonnet of the valve. As a result, forces on the order of 2,000 to 4,000 pounds of thrust are required to effect the initial movement of the valve stem relative to the high-pressure seal pack, regardless of what pressure exists in the valve. If the valve is under pressure, you obviously need still more thrust to be applied by the actuator.

Since most linearly actuated valves of this type are shiftable to either an open or closed position through the application of a fluid pressure to an actuator and are returned to the opposite position through the compression of a spring, then it is obvious that the springs employed must be capable of exerting thrust forces in excess of 4,000 pounds in order to effectively open or close the valve upon the removal of the actuating force on the valve stem. In light of physical size considerations, such spring forces inherently dictate the employment of Belleville disc springs, because only this type of spring can be axially stacked to generate a high thrust with a very short travel of the valve stem actuator. Once movement of the valve stem through the seal pack is initiated, it is highly desirable that the resultant movement of the valve stem be subject to hydraulic dampening in order to prevent damage to the actuator by the high decelerating forces generated in stopping the movement of the valve stem actuator in either direction. Furthermore, it is highly desirable that the stack of Belleville springs be disposed in a corrosion-free environment, such as being enclosed in an oil-filled reservoir to prevent rusting and, hence, embrittlement or weakening of the individual components of the stack of Belleville valve discs.

SUMMARY OF THE INVENTION

The invention provides a fluid pressure actuated, linear actuator for effecting the movement of a valve stem of a valve designed for insertion in a high fluid pressure circuit wherein the internal pressure within the valve may exceed 20,000 psi and the seal pack for the valve stem projecting out of the valve housing must be capable of preventing leakage at such pressures. The thrust required to be derived from fluid pressure forces on the actuator will most probably be in excess of 2,000 pounds, and this magnitude of thrust is conveniently derived by utilizing a higher pressure source of fluid as the actuating medium. It is contemplated that gas pressures on the order of 450 psi will be utilized to drive the actuator.

An actuator in accordance with this invention comprises a tubular housing of generally inverted cup-shaped configuration wherein the bottom end of the housing is attachable to the bonnet of the valve in surrounding relationship to the stem which is to be actuated. The top end of the cup-shaped housing defines a reduced-diameter seal bore within which is slidably and sealably mounted a rod-like actuator having conventional means at its lower end for effecting a detachable connection to the valve stem.

The lower end of the rod-like actuator is disposed in a large diameter cylindrical chamber defined in the housing and port means are provided for supplying high pressure gas to the upper end of the cylindrical chamber. An annular piston is secured to the rod-like actuator and its periphery slidably and sealably cooperates with the walls of the cylindrical chamber.

A second seal bore is provided in radially spaced relationship to the rod-like actuator above the location of the annular piston. Ah auxiliary annular piston is slidably and sealably mounted in the second seal bore and effects a seal with both the exterior of the rod-like actuator and the seal bore, thus effectively sealing the top end of the large cylindrical chamber.

Above the second seal bore, a second annular cylindrical chamber is provided and a compressible spring, preferably comprising an axial stack of Belleville discs, is mounted in such second cylindrical chamber to oppose downward movement of the actuator toward the valve which is produced through the action of supplied gas pressure on the upper face of the annular main piston.

The second cylindrical chamber is preferably entirely filled with a protective fluid, such as a lubricating oil. The volume of the second cylindrical chamber is unaffected by movements of the rod-like actuator and the stack of Belleville springs. It is, however, necessary to provide an expansion mechanism for such chamber to compensate for volume changes in the trapped fluid produced by ambient temperature changes surrounding the actuator. Such temperature compensating changes in volume are provided by the auxiliary annular piston which moves entirely independently of the main piston, the rod-like actuator, and the Belleville spring to provide additional volume for the second cylindrical chamber whenever the temperature expansion of the virtually non-compressible protective oil demands such action.

The auxiliary piston performs another function in the event that it is desired to actuate the valve when, for any reason, a source of high pressure actuating gas is not available for the main cylinder or the main cylinder seals have failed. A port is provided connecting with the second cylinder by which fluid communication can be established with an auxiliary, manually or foot operable hydraulic pump, and the fluid pressure to the second cylindrical chamber can thereby be substantially increased. As the pressure increases, the auxiliary piston moves into contact with the main piston and exerts a force on the main piston in the direction to actuate the valve stem. Increasing the pressure in the second cylindrical chamber to the level required to shift the valve stem will permit the valve to be opened or closed, as the case may be, in the event that the high-pressure source of actuating gas is not available for the main cylinder.

Further advantages of the invention will be readily apparent to those skilled in the art from the following detailed description, taken in conjunction with the annexed sheets of drawings on which is shown a preferred embodiment of the invention.

DESCRIPTION OF THE PREFERRED EMBODIMENT

Figure 1:
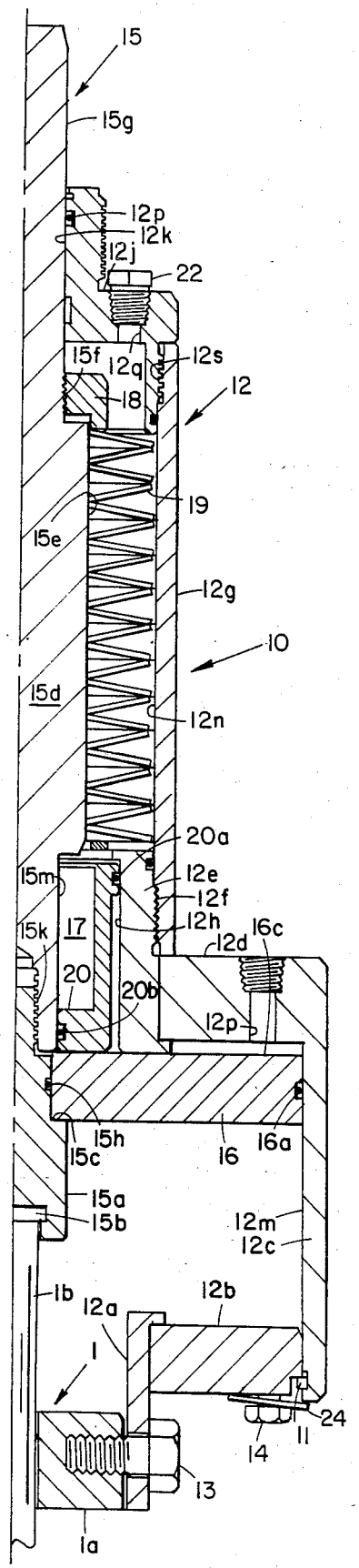
FIG. 1 is a sectional view of a fluid pressure valve actuator embodying this invention, with the components thereof shown in their inactive or inoperative position.

Referring to FIG. 1, a linear actuator 10 embodying this invention is shown in assembled relationship to the bonnet portion 1a of a stem-type valve 1 having a stem 1b projecting out of the valve bonnet 1a. Valve stem 1b is shiftable from either an open or closed position illustrated in FIG. 1 to a closed or open position illustrated in FIG. 2 by a linear actuating force imparted thereto by the actuator 10.

Actuator 10 comprises a tubular housing 12 formed by the threaded, bolted, and welded assemblage of a plurality of components. Housing 12 thus comprises mounting ring 12a which is secured by a plurality of peripherally spaced bolts 13 to the bonnet 1a of the valve 1. Mounting ring 12a is in turn attached to a horizontally extending annular ring 12b which is secured by bolts 14, washer 24, and retaining ring 11 to the bottom end of an enlarged diameter, cylindrical housing portion 12c. Cylindrical portion 12c has a radially, inwardly extending portion 12d integrally formed at its upper end, and this portion is welded to an upwardly extending sleeve portion 12e having external threads 12f formed thereon and defining an internal seal bore 12h. An axially extending sleeve 12g is threadably secured to the threads 12f at its bottom end and at its top end is provided with internal threads 12s which cooperate with a seal bore defining sleeve 12j. Seal bore sleeve 12j extends radially inwardly to define a small-diameter seal bore 12k at the upper end of the actuator housing 12.

It will therefore be seen that the actuator housing 12 defines at its lowermost end an enlarged diameter cylindrical chamber 12m above which is provided a first seal bore 12h and above the seal bore 12h, a second, smaller-diameter cylindrical chamber 12n is formed.

A generally rod-like actuator assemblage 15 is provided comprising a lower portion 15a having a slot 15b formed in the bottom thereof for effecting a conventional engagement with the upper end of the valve stem 1b. Lower portion 15a of the actuator rod assembly 15 has a reduced diameter upper portion defining a shoulder 15c on which an annular piston 16 is mounted in abutting relationship. The piston 16 is secured in the position illustrated in FIG. 1 by the bottom surface of the upper portion 15d of actuator assemblage 15 through the threaded cooperation of external threads 15k provided on the upper end of the lower portion 15a of the rod-like actuator assemblage 15 with internal threads formed in the bottom of the upper portion 15d of the rod-like actuator assemblage. The bottom end of upper portion 15d is of reduced external diameter 15m to cooperate with the seal bore 12h to define an annular cylinder chamber for a purpose to be hereinafter described.

The medial portion 15e of the upper portion 15d of actuator 15 functions as a spring guide. The uppermost portion is of reduced-diameter and carries threads 15f which mount an annular spring retainer 18. Above the threads 15f, the top end of rod-like actuator assemblage 15 is provided with a bearing surface 15g which cooperates in slidable and sealing relationship with the seal bore surface 12k of housing 12. A seal 12p mounted in the seal bore defining sleeve 12j provides the sealing of the slidably cooperating surfaces 12k and 15g.

The periphery of piston 16 mounts a sliding-type seal 16a which cooperates in sliding and sealing relationship with the interior cylindrical surface of the cylindrical chamber 12m. A seal 15h effects the sealing of the joint between the interior bore of the annular piston 16 and the piston-mounting portion 15c of the actuating rod 15. Radial wall portion 12d of the cylindrical chamber defining member 12c is provided with an appropriate port 12p, thus, the application of pressured gas through port 12p produces a downward force on the piston 16, hence forces the actuating rod assembly 15 downwardly and moves the valve stem 1b in a downward direction to the open or closed position, as the case may be, illustrated in FIG. 2 of the drawings.

The annular chamber 17 defined between the seal bore surface 12h and the exterior surface 15m of the portion 15d of the actuating rod accommodates an annular auxiliary piston 20 in slidable and sealable relationship. Seals 20a and 20b respectively provided in the upper and lower ends of the exterior and interior surfaces of the piston 20 cooperate with the adjacent bearing surfaces to provide the necessary seal. The auxiliary piston 20 is completely independent of movements of the actuating rod assembly 15 or the piston 16, unless such actuating rod is shifted to an extreme position beyond that illustrated in FIG. 2. The primary purpose of auxiliary piston 20 is to provide a seal between the lower piston chamber 12m and the upper, smaller diameter chamber 12n defined by the housing portion 12g. The secondary purpose of auxiliary piston 20 is to provide a fluid dampening chamber 17 which cooperates with an enlarged diameter portion 15e of the actuating rod assembly 15, as will be explained later.

The upper chamber 12n provides a convenient space for the mounting of a compressible spring 19 which is compressed between the spring retainer 18 secured to the top end of the actuating rod 15 and the top end of sleeve 12e. The compressible spring element 19 preferably comprises a stack of Belleville discs, since this type of spring is well known for its ability to generate very substantial opposing forces with a relatively modest axial displacement of the spring elements.

In accordance with this invention, the upper annular cylindrical chamber 12n housing the Belleville springs 19 is completely filled with a virtually non-compressible protective liquid, such as a lubricating oil. The filling may be accomplished through a port 12q provided in the seal bore element 12j, and a plug 22 seals the port 12q after it is filled with the protective fluid.

Figure 3:
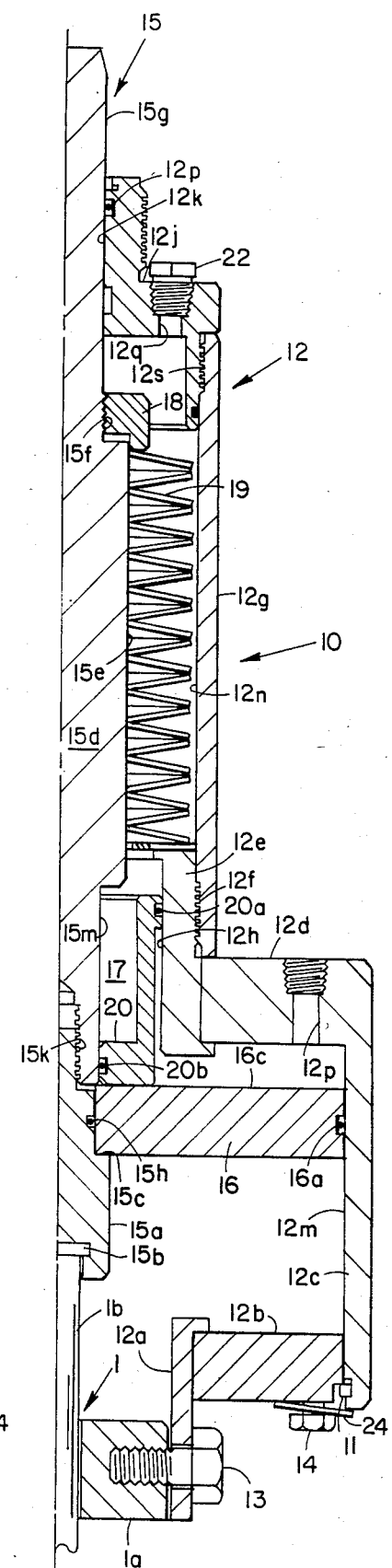
FIG. 3 is a view similar to FIG. 1, but illustrating the automatic increase in volume of the second cylindrical chamber produced by temperature expansion of the non-compressible fluid filling such chamber.

When the actuator 10 embodying this invention is employed with subterranean well valves, it is not unusual that the valve actuator experiences a substantial increase in temperature when the valve on which it is mounted is placed in service. The annular piston 20 therefore provides an additional function in that it can move downwardly to accommodate the temperature expansion of the non-compressible protective fluid contained in the chamber 12n, as illustrated in FIG. 3.

A third function may be performed by the annular piston 20 in the event that the supply of pressured gas normally supplied through port 12p to actuate the main piston 16 is, for any reason, interrupted or unavailable. In such case, the plug 22 may be removed and the port 12q can be connected to any conventional source of hydraulic pressure, including even a manual or foot-operated pump, so that pressure can be applied to the secondary chamber 12n which will force the annular auxiliary piston 20 downwardly, as illustrated in FIG. 3, and produce a downward displacement of the main piston 16 by the downward movement of the auxiliary piston 20. Thus, actuation of the main piston 16 and, hence, the desired shifting movement of the valve stem 1b may be accomplished, even though high-pressure gas is not available to drive the main piston 16 in the normal fashion.

Figure 2:
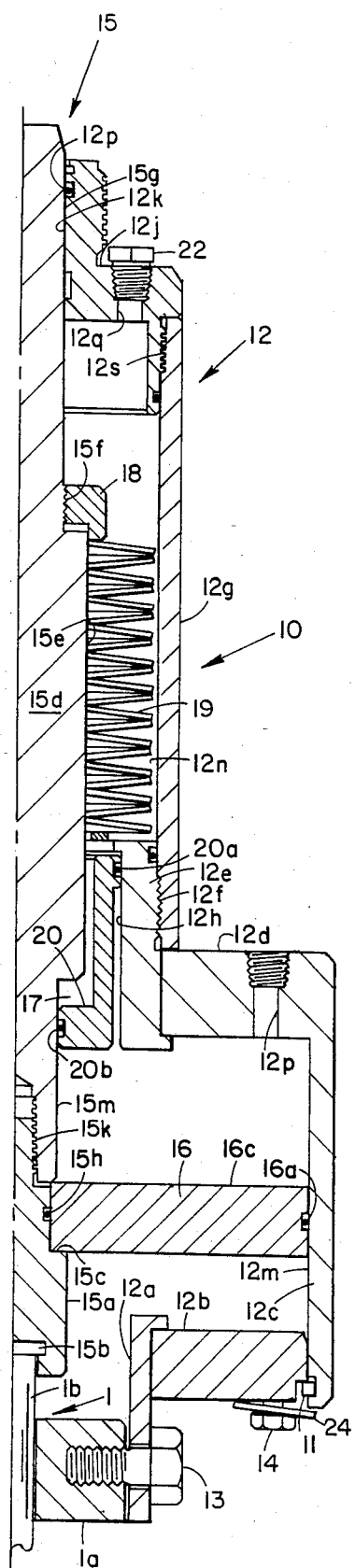
FIG. 2 is a view similar to FIG. 1 but showing the components of the valve positions assumed through the application of high-pressured gas to the main piston.

Lastly, those skilled in the art will recognize that the virtually non-compressible fluid filling the annular chamber 17 provides a dampening function especially desirable for pneumatic actuators. In the event of a stuck gate valve as gas pressure is applied to port 12p, the initial pressure will not provide adequate force to the annular piston 16 to effect movement of the valve stem 1b as shown in FIG. 2. The pressure may necessarily have to build to 200 or 300 psi before enough force is available to free the "frozen" gate, allowing actuation of the valve stem 1b. In such an event, when the resisting forces of the "frozen" gate are relieved, the 200 to 300 psi pressure buildup will provide force to the annular piston 16 in greatly in excess of the normal force required to provide actuation. The excess gas pressure will then expand, causing rapid acceleration of the rod-like actuator assembly 15 by the annular piston 16, as shown in FIG. 2. As the larger, medial portion 15e of the rod-like actuator 15 enters the annular dampening chamber 17, the non-compressible fluid must necessarily flow through the restricted annular passage into the secondary chamber 12n, thus effecting sufficient dampening to decelerate the valve stem 1b by the rod-like actuator assembly 15, therefore preventing possible valve damage from "slamming". A similar dampening effect is produced by reverse movement of the actuator assembly 15.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A linear actuator for an axially movable stem of a valve, comprising, a tubular housing having one end portion fixedly connectable to the valve in surrounding relation to the valve stem and another end portion defining a first seal bore; a rod-like actuator inserted in said housing and having one end attachable to the valve stem and the other end slidably and sealingly engaging said seal bore; a main piston secured to said actuator; said tubular housing defining a first cylindrical chamber cooperable with the periphery of said main piston; means for supplying fluid pressure to said first cylindrical chamber to urge said main piston axially relative to said tubular housing to shift the valve stem; said tubular housing defining a second cylindrical chamber surrounding a medial portion of said actuator; resilient means mounted in said second cylindrical chamber opposing said fluid pressure induced movement of said actuator; said housing further defining a second seal bore interconnecting said first and second cylindrical chambers; a non-compressible liquid filling said second cylindrical chamber; and an auxiliary piston slidably and sealably mounted in said second seal bore, thereby accommodating temperature expansion of said non-compressible liquid in said second cylindrical chamber and permitting axial movements of said actuator without changing the volume of said second cylindrical chamber.

2. An actuator in accordance with claim 1 wherein said resilient means comprises an axially extending stack of Belleville springs.

3. An actuator in accordance with claim 1 wherein said auxiliary piston is abuttable with said main piston when no substantial fluid pressure exists in said first cylindrical chamber, plus means for introducing a pressured fluid in said second cylindrical chamber to cause said auxiliary piston to axially shift said main piston and actuator in the absence of sufficient fluid pressure in said first cylindrical chamber to effect such shifting.

4. An actuator in accordance with claim 3 wherein said resilient means comprises an axially extending stack of Belleville springs mounted in said second cylindrical chamber.

5. An actuator in accordance with claim 1 further comprising means for dampening the fluid pressure produced movement of said rod-like actuator.

6. An actuator in accordance with claim 1 wherein said auxiliary piston defines an annular dampening chamber communicating with said second cylindrical chamber; and an enlarged diameter portion on said rod-like actuator movable into said dampening chamber when said main piston is actuated to cause a flow of fluid out of said dampening chamber through a constricted annulus defined between said dampening chamber wall and said enlarged-diameter portion.

7. A linear actuator for an axially movable valve stem projecting out of a valve housing, comprising, in combination, a tubular housing attachable at one end to the valve housing in concentric relation to the valve stem; said tubular housing defining in axially spaced sequence from said one end:

(1) a first cylindrical chamber;
(2) a first reduced-diameter, axially extending seal bore in fluid communication with said first cylindrical chamber;
(3) a second cylindrical chamber in fluid communication with said first seal bore; and
(4) a second reduced-diameter, axially extending seal bore communicating with said second cylindrical chamber;

a rod-like actuator concentrically mounted in said tubular housing and having its inner end portion attachable to the valve stem and its outer end portion slidably and sealably cooperating with said second seal bore; an annular main piston secured to the inner medial portion of said actuator and slidably and sealably cooperating with the said first cylindrical chamber; means for supplying fluid pressure to the outer face of said annular piston to axially shift said actuator toward the valve housing; an auxiliary annular piston slidably and sealably mounted between said first seal bore and the adjacent portions of said actuator, thereby fluid isolating said first and second cylindrical chambers; said second cylindrical chamber being filled with a non-compressible liquid, whereby said auxiliary piston is shiftable by temperature-induced expansion or contraction of said non-compressible liquid.

8. The apparatus of claim 7 further comprising an annular compressible spring mounted in said second cylindrical chamber between said actuator and said tubular housing to oppose inward movement of said actuator.

9. An actuator in accordance with claim 8 wherein said annular compressible spring comprises an axially extending stack of Belleville springs.

10. An actuator in accordance with claim 7 wherein said auxiliary piston is abuttable with said main piston when no substantial fluid pressure exists in said first cylindrical chamber, plus means for introducing a pressured fluid in said second cylindrical chamber to cause said auxiliary piston to axially shift said main piston and actuator in the absence of sufficient fluid pressure in said first cylindrical chamber to effect such shifting.

11. An actuator in accordance with claim 7 further comprising means for dampening the fluid pressure produced movement of said rod-like actuator.

12. An actuator in accordance with claim 7 wherein said auxiliary piston defines an annular dampening chamber communicating with said second cylindrical chamber; and an enlarged diameter portion on said rod-like actuator movable into said dampening chamber when said main piston is actuated to cause a flow of fluid out of said dampening chamber through a constricted annulus defined between said dampening chamber wall and said enlarged diameter portion.

* * * * *